US012789496B2

(12) United States Patent
Hausmann

(10) Patent No.: US 12,789,496 B2
(45) Date of Patent: Nov. 10, 2026

(54) METHOD FOR PROCESSING PLANAR MATERIAL WEBS MADE OF A FIBER-CONTAINING MATERIAL

(71) Applicant: Kiefel GmbH, Freilassing (DE)

(72) Inventor: Matthias Hausmann, Unken (AT)

(73) Assignee: Kiefel GmbH, Freilassing (DE)

( * ) Notice: Subject to any disclaimer, the term of this patent is extended or adjusted under 35 U.S.C. 154(b) by 50 days.

(21) Appl. No.: 18/741,958

(22) Filed: Jun. 13, 2024

(65) Prior Publication Data

US 2024/0416612 A1 Dec. 19, 2024

(30) Foreign Application Priority Data

Jun. 16, 2023 (DE) ..................... 10 2023 115 815.5

(51) Int. Cl.
*B31F 1/00* (2006.01)
*B29C 51/04* (2006.01)

(52) U.S. Cl.
CPC .................................. *B31F 1/0077* (2013.01)

(58) Field of Classification Search
CPC .......... B31F 1/0077; B31F 1/122; B31F 1/36; B29B 11/16; B29B 2009/161; B29B 13/023; B27N 1/00; B27N 3/04; B27N 3/12; B27N 3/16; B27N 3/18; B29C 51/02; B29C 51/002; B29C 51/04; B29C 51/082; B29C 2791/001; B29C 2793/0009; B29C 2793/0081; B29C 2793/009; B31B 50/592; B31B 50/741; B29K 2105/12; B29K 2105/26; B29K 2311/12
See application file for complete search history.

(56) References Cited

U.S. PATENT DOCUMENTS

| | | | | |
|---|---|---|---|---|
| 4,313,899 | A * | 2/1982 | Hain | B31F 1/36 264/134 |
| 4,648,934 | A | 3/1987 | Kiss | |
| 5,897,481 | A | 4/1999 | Baumuller | |
| 2009/0071108 | A1* | 3/2009 | Nelson | B21D 22/206 206/531 |
| 2013/0171422 | A1 | 7/2013 | De Luca et al. | |

FOREIGN PATENT DOCUMENTS

| | | | |
|---|---|---|---|
| DE | 43 34 364 | A1 | 5/1994 |
| DE | 10 2016 106142 | A1 | 10/2017 |
| WO | 96/29196 | A1 | 9/1996 |
| WO | 2017/160218 | A1 | 9/2017 |

OTHER PUBLICATIONS

English translation of WO9629196A1 (Year: 1995).*
Extended European Search Report in Appl. No. 24180650.4 mailed Nov. 21, 2024, 7 pages.
Search Report in German Appl. No. 10 2023 115 815.5 mailed Nov. 12, 2024, 5 pages.

* cited by examiner

*Primary Examiner* — Galen H Hauth
*Assistant Examiner* — Baileigh Kate Darnell
(74) *Attorney, Agent, or Firm* — Kowert, Hood, Munyon, Rankin & Goetzel, P.C.; Gareth M. Sampson; Dean M. Munyon

(57) ABSTRACT

A method for processing planar material webs made of a fiber-containing material is disclosed. The planar material webs are fed as material web portions or endless material web, for the production of three-dimensional products. Before a material web is pressed for shaping, the material web is preformed three-dimensionally by deforming the material web in at least one direction substantially without stretching or compressing.

9 Claims, 3 Drawing Sheets c)

d)

a)

b)

METHOD FOR PROCESSING PLANAR MATERIAL WEBS MADE OF A FIBER-CONTAINING MATERIAL

PRIORITY CLAIM

The present application claims priority under 35 U.S.C. § 119 to German Patent Application No. DE 10 2023 115 815.5, filed Jun. 16, 2023, the disclosure of which is incorporated by reference herein in its entirety.

TECHNICAL FIELD

Methods are described for processing planar material webs made of a fiber-containing material, which are fed as material web portions or endless material webs, to produce three-dimensional products.

DESCRIPTION OF RELATED ART

More and more products for food packaging or consumer goods are being made from a fiber-containing material. Recently, paper-like material webs or material web portions have often been subjected to forming, where the paper is formed in a manner similar to a thermoforming process for plastics. The fiber-containing material of a paper-like material web can include natural fibers or artificial fibers, although recently there has been an increase in the use of fiber-containing material that has natural fibers or include fibers that can be obtained, for example, from renewable raw materials or waste paper.

BACKGROUND

Due to their properties, paper-like material webs can only be formed to a limited extent and therefore do not have great forming depths. In particular, paper-like material can only be stretched within a very limited range (2-5% with respect to the starting material) and is not flowable, which is exploited, for example, in the production of products from a wet fiber pulp. When forming paper-like material, it is therefore very easy to weaken and damage (e.g. tearing) the material. As a result, it is currently only possible to produce very flat products that are unlikely to have complex geometries.

SUMMARY

Object

Thus, it is an object of the present disclosure to provide a solution for the production of three-dimensional products from a fiber-containing material that eliminates the disadvantages of the prior art and provides the production of three-dimensional products from fiber-containing material that is substantially not subject to any limitations with respect to forming depth and product geometry when producing three-dimensional products from a paper-like material.

Solution

The above-mentioned object is achieved by a method for processing planar material webs made of a fiber-containing material, which are fed as material web portions or endless material webs, for the production of three-dimensional products, where, prior to pressing a material web for shaping, the material web is preformed three-dimensionally by deforming the material web in at least one direction substantially without stretching or compressing in the region of the product.

This means that the material web can, for example, have a projection due to preforming, without the material itself being under tension. However, an alignment of the material is achieved, whereby, for example, a side wall surface of a product is provided by a projection. Furthermore, an upper part can constitute a floor section of a product to be produced. The projection can, for example, extend all the way around or only in portions from the original planar alignment of the material web. After preforming, a pressing tool can press the preformed regions during pressing, where substantially no deformation of the material web has to take place and thus only a very slight stretching of the material occurs. This eliminates damage while increasing product diversity in terms of forming depth and complexity.

In further embodiments, the material web can be substantially freely movable during the three-dimensional preforming. The material web can be preformed in the region to be preformed by an externally introduced movement without stretching the material. The movement can be carried out, for example, by a forming tool or a forming aid (e.g., punch, etc.), where a paper-like material is pushed into a cavity without being stretched.

In further embodiments, the material web can be pushed together laterally on the surface.

In further embodiments, at least one region of a material web can be selectively fixed in terms of position and/or orientation with respect to a geometry of a product to be produced during the three-dimensional preforming so that stress-free deformation occurs in selected regions. Regions that are not to be preformed can be fixed in a targeted manner, for example by clamping. This allows a defined preforming to be achieved.

In further embodiments, at least one region of a material web can be selectively severed with respect to a geometry of a product to be produced prior to and/or during the three-dimensional preforming. For example, portions of a material web can be cut, which are adjacent to one another and are each used to produce a product. Because the material is displaced rather than stretched during preforming, material could be pulled from adjacent portions or material could be tensioned, in particular in preforming tools having multiple cavities. Such unwanted displacement of the material can be counteracted by at least partial cutting.

In further embodiments, at least one region of a material web can be selectively moistened and/or subjected to additivation with respect to a geometry of a product to be produced prior to the three-dimensional preforming. Moistening supports the deformability of a paper-like material in particular. In addition to influencing the deformability, an additivation can also introduce other properties (e.g., barrier) to the material and the finished product.

In further embodiments, three-dimensional preforming can be carried out in at least two preforming steps, where the complexity and forming depth of products is significantly increased as a result.

In further embodiments, a three-dimensional deformation of a plurality of portions of a material web for a corresponding plurality of products can take place simultaneously and the portions can be decoupled from one another so that an individual three-dimensional deformation of the portions is carried out, where no mutual influence of the portions due to the respective three-dimensional deformation occurs. For this purpose, a fiber material can be fixed and/or severed in certain regions.

The pretreatment of the fiber-containing material, which is fed as a raw material/semi-finished product for the production of products, allows for the production of products with large forming depths, ribs or other designs, which could not previously be achieved due to the dry state of the starting material, by means of stress/stretch-free deforming and, in further embodiments, by moistening the fiber-containing material in selectable regions.

Preforming can take place directly in a production process prior to further processing (e.g., shaping by pressing at high pressure/temperature).

In further embodiments, a product-specific pretreatment with at least one temperature, moisture and/or steam treatment of and/or an additivation of the fiber-containing material can be carried out prior to preforming. The treatment can be carried out, for example, by spraying regions and/or targeted heating (e.g., using infrared light or heating dies). Furthermore, the fiber-containing material can, for example, be exposed to a humid climate inside a chamber, where, for example, the surface of the fiber-containing material is moistened and/or mixed with additives and admixtures. The properties of the fiber-containing material can be improved with an optional or additional temperature treatment. The improvement of the properties of the fiber-containing material primarily relates to properties that are crucial for a subsequent processing step, such as a forming process. In addition, the properties of the final product can also be influenced, where such treatment often takes place after a forming process, as deformation can, for example, damage a previously applied barrier layer.

In further embodiments, the pretreatment can have at least one pretreatment step.

In further embodiments, a selective pretreatment of the fiber-containing material can be carried out. Selective pretreatment, which depends on a product geometry of the product to be produced, can include, for example, different pretreatment of regions. For example, to achieve homogeneous barrier properties for a finished product, an uneven coating or pretreatment can be carried out so that the final product still has a uniform layer thickness (e.g., barrier layer) according to the deformation. In further embodiments, regions with high moisture (20-50%) can be covered, where the moistening of the entire region of a fiber-containing material for a product remains below 20% in total in order to avoid steam explosions in the forming process.

In further embodiments, during selective pretreatment, only regions that will be deformed in a downstream process step can be pretreated, so that a uniform product quality and properties of a finished product can be achieved.

In further embodiments, the pretreatment can be applied to the surface of the fiber-containing material from at least one side. The fiber-containing material is usually fed through the pretreatment in a transport direction and has, for example, a bottom side and a top side. In this case, the pretreatment can, for example, only affect the bottom side or the top side. In further embodiments, pretreatment can also be carried out on the bottom side and the top side. In further embodiments, the pretreatment of a top side and a bottom side can be carried out alternately.

In further embodiments, the pretreatment can take place in a plurality of pretreatment steps, where different pretreatments can be carried out in the pretreatment steps, the sequence of which can be coordinated with one another or can take place in any order, depending on the requirements.

In further embodiments, the pretreatment can take place within a pretreatment chamber in which the fiber-containing material is at least temporarily protected against external influences. Such pretreatment can be used, for example, to carry out special pretreatments in an atmosphere (pressure, temperature, (air) moisture) that differs from the atmosphere of the production process or a production site. Appropriate means, such as movable flaps or the like, can be provided for temporarily decoupling the interior of a pretreatment chamber.

In further embodiments, different properties may prevail in at least one portion of the pretreatment chamber with respect to the environment of the pretreatment chamber, where the properties include pressure, temperature and/or moisture.

In further embodiments, the quality and appearance or properties of products can be checked and evaluated using additional devices (sensors, cameras, etc.). If deviations from a target value are detected, the process parameters of the pretreatment can be adjusted and changed directly via a control system, where, for example, regions are moistened more or less and/or a local adjustment (e.g., by changing the orientation of nozzles, etc.) of the regions of the fiber-containing material to be moistened can be made. In further embodiments, the temperature and/or the throughput speed can also be adjusted during pretreatment.

In further embodiments, a first preforming and/or first pretreatment can be carried out prior to a first further processing step, where at least a second preforming and/or pretreatment is subsequently carried out prior to at least a second further processing step. For example, preforming can be carried out first, where regions of fiber-containing material are deformed without stretching and are subjected to an optional pretreatment (e.g., moistening) for this purpose, which regions are subsequently preformed. This is followed by further preforming of regions that are then finally formed in a final second forming station. The step-by-step preforming and/or pretreatment thus always takes place immediately prior to the respective further processing step or forming process so that the properties of the fiber-containing material can be specifically influenced for the next processing.

Further features, embodiments and advantages result from the following illustration of exemplary embodiments with reference to the figures.

DETAILED DESCRIPTION

Various embodiments of the technical teaching described herein are shown below with reference to the figures. Identical reference signs are used in the figure description for identical components, parts and processes. Components, parts and processes that are not essential to the technical teachings disclosed herein or that are obvious to a person skilled in the art are not explicitly reproduced. Features specified in the singular also include the plural unless explicitly stated otherwise. This applies in particular to statements such as "a" or "one."

Figure 1:
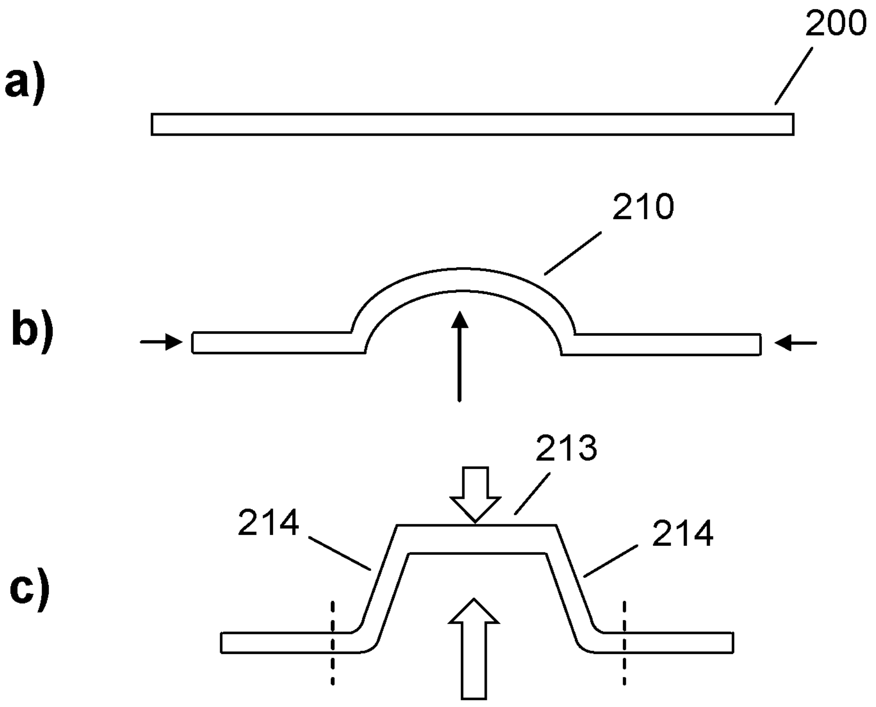
FIG. 1 depicts schematic representations of a procedure for preforming a material web made of a fiber-containing material, according to some embodiments.

FIG. 1 shows schematic representations of a procedure for preforming a material web made of a fiber-containing material.

FIG. 1*a*) schematically shows a material web portion 200 made of a paper-like material web, which includes a fiber-containing material (e.g., natural fibers) and may have additives. As with normal paper, the height of the material web portion 200 is relatively low. In other embodiments, it may be higher than in the case of normal paper. The material of the material web portion 200 has a relatively low moisture content of 6-10 wt. %.

FIG. 1*b*) shows the material web portion 200 during a preforming step, where here, as indicated by the arrows, the material web portion 200 is deformed laterally and/or from below so that a material accumulation results in the center. There, the material web portion 200 forms a projection 210. It should be noted that the planar extent decreases because the material of the material web portion 200 is pushed into the center. Substantially no stretching of the material occurs, so that the material web portion 200 does not tear or otherwise become damaged. Preforming can be carried out using auxiliary means and/or a forming tool.

FIG. 1*c*) shows the material web portion 200 during a final forming step, where the preformed region 213 of the material web portion 200 is pressed under high pressure (specific surface pressure 100 to 5,000 N/cm$^2$) and high temperatures (20 to 250° C.), where steep side walls 214 can be produced from a paper-like material without damaging the material due to the large forming depth.

Figure 2:
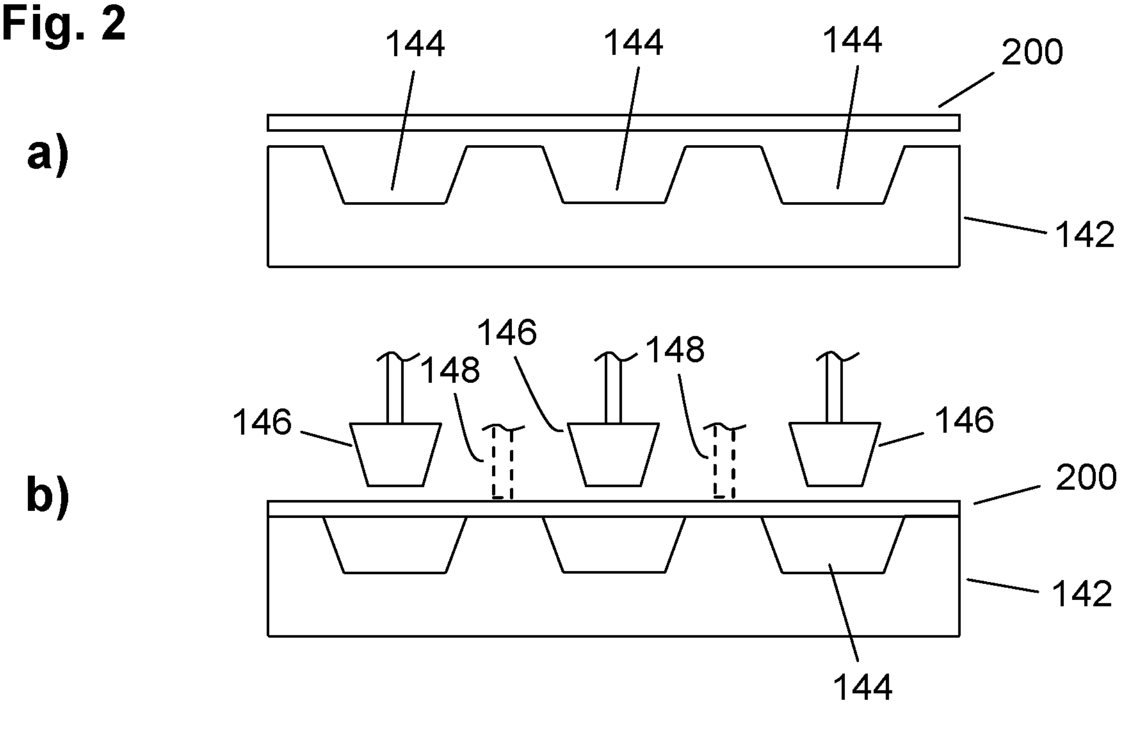
FIG. 2 depicts schematic representations of a procedure for preforming a material web made of a fiber-containing material, according to some embodiments.
Figure 2:
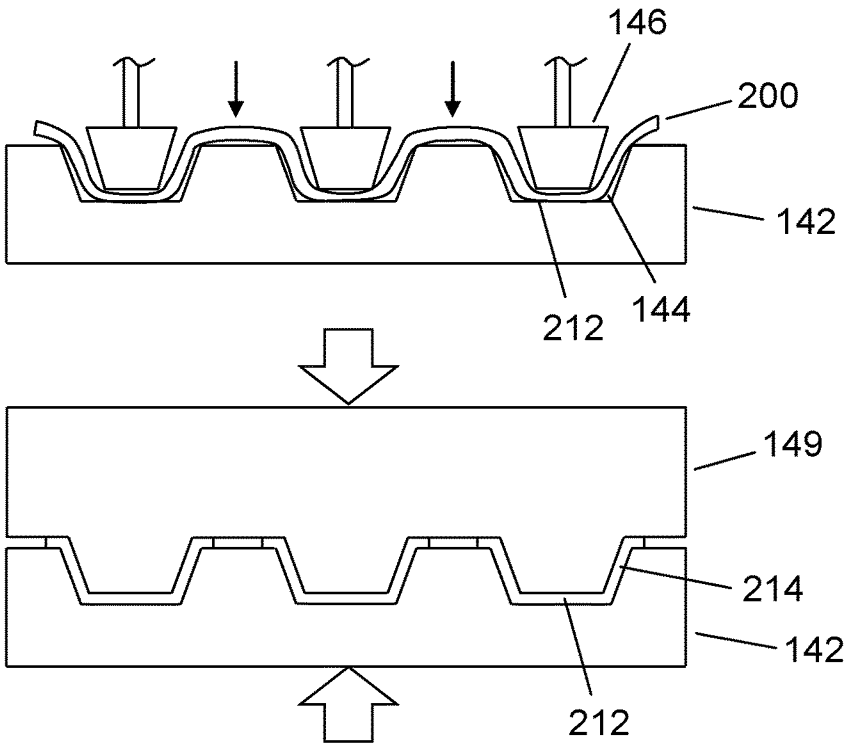

FIG. 2 shows schematic representations of a procedure for preforming a material web made of a fiber-containing material. Here, a material web portion 200 is fed to a forming tool 140 that has a plurality of cavities 144. Depending on the design, the cavities 144 can either have the final shape of a product to be produced or a preformed preform. In case of the latter, the material can be pressed completely against a corresponding surface, where a stretching of the material that would otherwise occur in the prior art can be compensated for by the fact that the material can be pulled laterally into the cavity 144 from the outside so that despite the deformation, the material itself is not stretched. In particular, this ensures that the material is displaced in certain regions instead of being stretched. The material of the material web portion 200 is thus substantially freely movable.

In a subsequent step (FIG. 2*b*), the material web portion 200 is pressed downward via preforming punches 146. In addition, cutting devices 148 can be used that sever the regions of the material web portion 200 associated with the cavities 144 between the cavities 144 so that the material can slide into the cavities 144 during preforming without mutual interference.

As shown in FIG. 2*c*, additionally or alternatively, at least in the regions shown in the example between the cavities 144, the material web portion 200 can be clamped or fixed in order to avoid mutual interference. In further embodiments, clamping can be carried out in combination with severing. In further embodiments, the material of the material web portion 200 can also be fixed in the region of the bottom surface of a cavity 144 via the preforming punches 146 in order to sufficiently preform a bottom 212 for a product and to prevent material from being pulled from the region of the bottom in the direction of the side wall portions.

After preforming, the preformed portions are pressed into final products in the cavities 144 between the tool halves 142 and 149, as shown in FIG. 2*d*.

In further embodiments, a selective moistening of regions of the material web portion 200 can additionally take place prior to preforming in order to support or facilitate the preforming.

Figure 3:
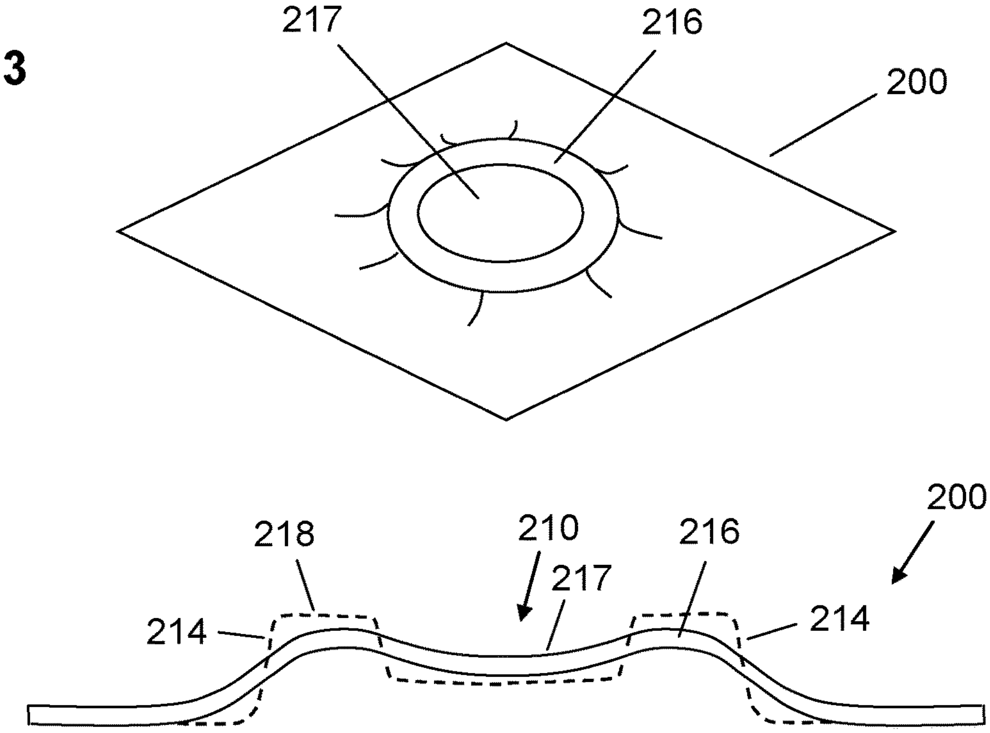
FIG. 3 depicts schematic representations of a preformed material web, according to some embodiments.

FIG. 3 shows schematic representations of a preformed material web. FIG. 3*a* shows an already preformed material web portion 200 having a trough 217 in the center and a preformed ring 216 surrounding the trough 217.

FIG. 3*b* shows a section through the material web portion 200 of FIG. 3*a* with the formation of the preformed regions and the final shape after pressing (dashed line). Preforming can be carried out using two halves of the forming tool, which press the material web portion 200 against corresponding forming surfaces without substantial stretching occurring. An appropriate tool design can allow material to "slide" into a cavity.

By preforming, the paper-like material can easily be brought into its final shape in a subsequent pressing step, as shown by the dashed line representing (final formed) edge 218, since the material is or has to be only slightly deformed and thus stretched between the orientation and shaping by preforming and the final shape. This allows complex geometries and large forming depths to be achieved in paper-like materials without damage or complex treatments.

Figure 4:
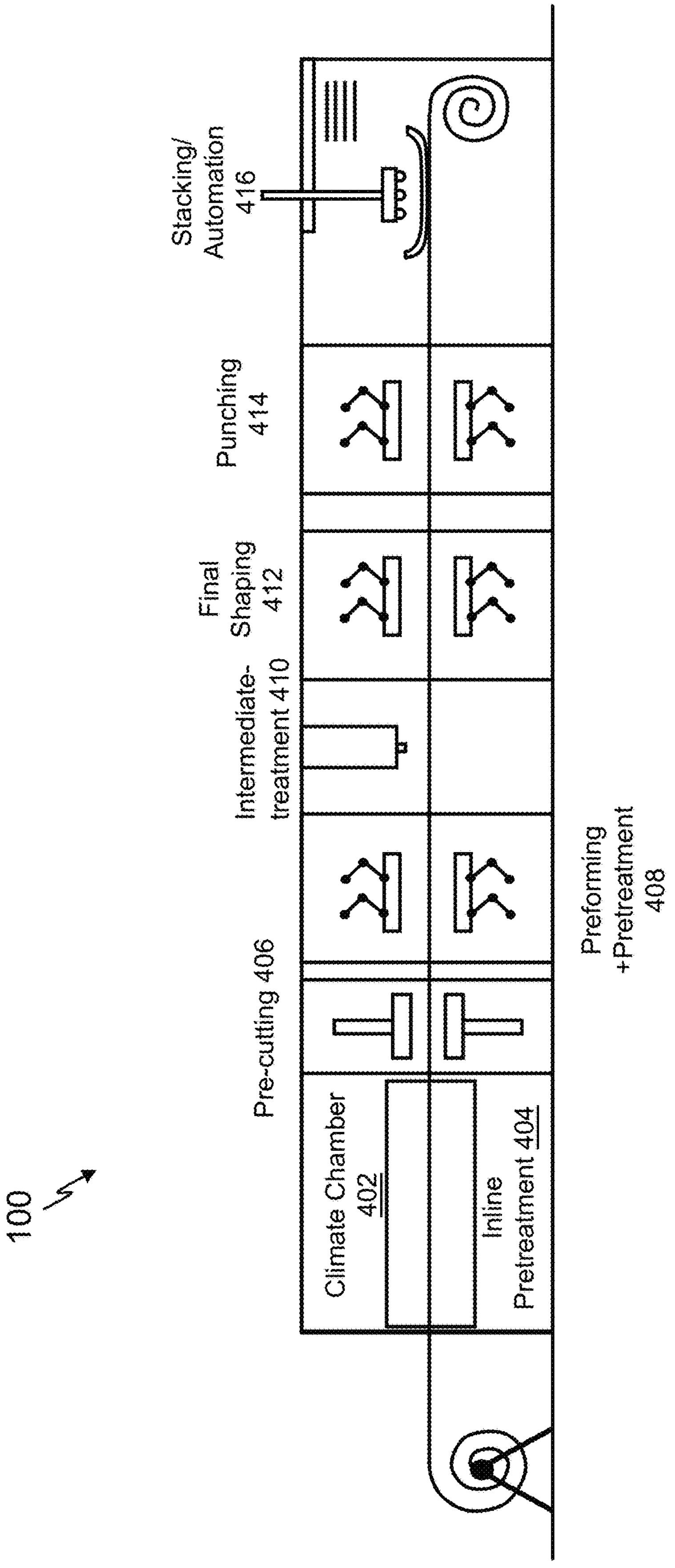
FIG. 4 depicts a schematic representation of a fiber forming facility for producing three-dimensional products from a fiber-containing material, according to some embodiments.

FIG. 4 shows a schematic representation of a fiber forming facility 100 for producing three-dimensional products from a fiber-containing material. For this purpose, individual material web portions 200 or a material web can be fed from a roll or another feeding device, as shown in FIG. 4.

The fiber forming facility 100 can be used to produce products that are biodegradable and can themselves be used again as a starting material for the production of three-dimensional product made of a fiber-containing material and can be composted because they can generally be completely decomposed and do not contain any harmful, environmentally hazardous substances. The products can be designed, for example, as cups, lids, bowls, capsules, plates and other molded and/or packaging parts (e.g., as holding/support structures for electronic or other devices).

In the illustrated embodiment, the fiber forming facility 100 has a feeder. As schematically indicated, the feeder can also have a transport device that serves to transport a material web or web portions. The transport device can be designed in a variety of ways. The material web passes through a pretreatment chamber (e.g., climate chamber 402) and is subjected to pretreatment (e.g., inline pretreatment 404). During pretreatment, properties of the material web are selectively influenced in a product-specific manner in order to support or allow a directly subsequent preforming and/or shaping. Subsequently pre-cutting 406 can take place. This is followed by preforming and optional pretreatment 408. Afterwards, an intermediate treatment 410 can take place. This is followed by final shaping 412. Subsequently the finished products can be separated from the remaining material using a punch (e.g., punching 414) and then fed to a stacking and/or automation station (416).

The material web can be fed continuously or intermittently via the feeding device. In the example shown, the pretreatment and shaping take place during a feed pause. To ensure continuous unwinding of the material web, devices for length compensation can be provided, as are known, for example, from thermoforming systems for plastics films.

The fiber forming facility 100 may have further stations and devices. For example, a supply of fiber-containing material can be provided.

The pretreatment chamber (e.g., climate chamber 402) can include a housing that surrounds the space in which the pretreatment takes place. The pretreatment chamber has a passage on the inlet and outlet sides, which can be closed in other embodiments. This allows the space within the pretreatment chamber to be substantially sealed or decoupled from its surroundings so that, at least temporarily, other conditions (temperature, moisture, pressure) can prevail within the pretreatment chamber.

Optional post-processing of the produced products can include, for example, printing, dyeing, filling, stacking, etc.

For controlling the production steps and the pretreatment, the fiber forming facility 100 also has at least one controller that, in further embodiments, is connected to at least one monitoring device (e.g., camera, sensors, etc.) in order to adjust and regulate the preforming, the moistening of regions of the fiber-containing material and the pretreatment.

In addition, the surface finish and properties of the product to be produced can be substantially influenced and improved in a two-stage forming or pressing process. For example, after a first forming step, the entire product can be moistened again or pressed again at a different pressure and/or temperature.

Until now, the forming of planar material webs made of a fiber-containing material, such as dry paper (cardboard, special paper, airlaid, compressed airlaid, nonwoven) made of natural fibers has been limited by the stretchability (2-10%) and/or the material flow into the form geometry (formation of folds or tears). As a result, only simple product geometries ("false" bowls or plates) were previously possible for products made from such materials.

Instead of using or providing very complex, expensive papers or process preparations of one or more paper layers for higher degrees of forming, the technical teaching described herein involves a "material accumulation" of the required material in special geometric regions in at least one process step in order to ultimately achieve high degrees of deforming at this point in the product (e.g., undercut, sharp radius, rib on the inside, etc.).

To realize preforming in multi-cavity tools, a corresponding system having pre-cutting and hold-down devices can be combined with the preforming and final forming devices such that the material flow can be controlled and monitored in a targeted manner. This also prevents the cavities from influencing one another. In further embodiments, this process can be supported and simplified by means of targeted moisture (moist paper or spraying of water shortly before forming) and heat input (hot tool). This means that the product range can be significantly increased with available papers (see above), for example to produce SipLids, lids with a tight fit, plates, trays or clam shells with segments, steep (<15°) draft angles and small radii on the bottom (<10 mm). Furthermore, the deep drawing rates can be significantly increased (>20 mm).

LIST OF REFERENCE SIGNS

100 Fiber forming facility
140 Forming tool
142 Tool half
144 Cavity
146 Preforming punch
148 Cutting device
149 Tool half
200 Material web portion
210 Projection
212 Bottom
213 Preformed region
214 (Final formed) side wall
216 Preformed ring
217 (Preformed) trough
218 (Final formed) edge
402 Climate Chamber
404 Inline pretreatment
406 Pre-cutting
408 Preforming+Pretreatment
410 Intermediate-treatment
412 Final shaping
414 Punching
416 Stacking/Automation

The invention claimed is:

1. A method for processing planar material webs made of a fiber-containing material, wherein the planar material webs are fed as material web portions or endless material webs for production of a plurality of three-dimensional products simultaneously, wherein, prior to pressing a planar material web for shaping, the planar material web is deformed by pressing a plurality of portions of the planar material web in at least one direction substantially without stretching or compressing to form a plurality of three-dimensional preforms simultaneously, the three-dimensional preforms having shapes corresponding to shapes of three-dimensional products in regions of the three-dimensional products, wherein the portions of the planar material web are decoupled from one another such that an individual three-dimensional deformation of the portions is carried out, and wherein at least one region of the planar material web between at least two of the portions is at least partially severed prior to and/or during the three-dimensional preforming.

2. The method according to claim 1, wherein the planar material web is substantially freely movable during the deforming.

3. The method according to claim 1, wherein the planar material web is pushed together laterally on a surface during the deforming.

4. The method according to claim 1, wherein at least one region of the planar material web is selectively fixed in terms of position and/or orientation with respect to a geometry of the three-dimensional product to be produced during the deforming.

5. The method according to claim 1, wherein at least one region of the planar material web is selectively moistened and/or subjected to additivation with respect to a geometry of the three-dimensional product to be produced prior to the deforming.

6. The method according to claim 1, wherein deforming takes place in at least two preforming steps.

7. The method according to claim 1, wherein deforming of the plurality of portions of the planar material web takes place simultaneously with no mutual influence occurring between the portions due to the respective deformation.

8. The method according to claim 1, wherein the shape of the three-dimensional preform corresponds to a shape of a final three-dimensional product to be produced by the method.

9. The method according to claim 1, further comprising clamping the at least one region of the planar material web between the at least two of the portions while it is being at least partially severed prior to and/or during the three-dimensional preforming.

* * * * *